(12) United States Patent
Shih

(10) Patent No.: US 11,221,048 B2
(45) Date of Patent: Jan. 11, 2022

(54) UNIDIRECTIONAL ROTARY BEARING

(71) Applicant: Tai-World Mfg. Co., Ltd., Changhua (TW)

(72) Inventor: Sen-Tien Shih, Changhua (TW)

(73) Assignee: Tai-World Mfg. Co., Ltd., Changhua (TW)

( * ) Notice: Subject to any disclaimer, the term of this patent is extended or adjusted under 35 U.S.C. 154(b) by 0 days.

(21) Appl. No.: 16/891,387

(22) Filed: Jun. 3, 2020

(65) Prior Publication Data

US 2020/0291992 A1 Sep. 17, 2020

Related U.S. Application Data

(63) Continuation-in-part of application No. 15/821,938, filed on Nov. 24, 2017, now abandoned.

(51) Int. Cl.
*F16D 41/08* (2006.01)
*F16D 41/067* (2006.01)

(52) U.S. Cl.
CPC .......... *F16D 41/08* (2013.01); *F16D 41/067* (2013.01)

(58) Field of Classification Search
CPC ......... F16D 41/08; F16D 41/067; F16D 41/28
See application file for complete search history.

(56) References Cited

U.S. PATENT DOCUMENTS

| | | | |
|---|---|---|---|
| 2,613,776 A | 10/1952 | Friedman | |
| 3,236,337 A | 2/1966 | Marland et al. | |
| 3,994,377 A | 11/1976 | Elmore | |
| 4,770,279 A | 9/1988 | Shiozaki et al. | |
| 6,796,414 B2 * | 9/2004 | Hu | F16D 41/067 188/82.84 |
| 8,251,195 B2 | 8/2012 | Li et al. | |
| 2008/0179156 A1 | 7/2008 | Byun | |
| 2011/0168119 A1 | 7/2011 | Steele et al. | |

FOREIGN PATENT DOCUMENTS

| | | | |
|---|---|---|---|
| DE | 102010052922 | * | 5/2012 |
| DE | 102010052922 A1 | | 5/2012 |
| GB | 953466 | | 3/1964 |

OTHER PUBLICATIONS

Machine translation of DE102010052922.*

* cited by examiner

*Primary Examiner* — Mark A Manley
(74) *Attorney, Agent, or Firm* — Karin L. Williams; Alan D. Kamrath; Mayer & Williams PC

(57) ABSTRACT

A unidirectional rotary bearing contains a bearing body, multiple rollers, two rotatable driving rings, and at least two homing springs. The bearing body includes an internal surface and two peripheral surfaces, the internal surface has multiple receiving grooves each having an engagement segment and a disengagement segment, and each peripheral surface has a circular groove. Each of the multiple rollers is columnar and has a diameter which is more than an engaging depth of the engagement segment of each receiving groove of the bearing body and is less than a disengaging depth of the disengagement segment of each receiving groove of the bearing body, and each roller has two drive extensions. A diameter of each of the multiple apertures is more than each of the two drive extensions and is less than the diameter of each roller.

2 Claims, 18 Drawing Sheets

UNIDIRECTIONAL ROTARY BEARING

This application is a Continuation-in-Part of application Ser. No. 15/821,938, filed Nov. 24, 2017.

BACKGROUND OF THE INVENTION

Field of the Invention

The present invention relates to a rotary bearing, and more particularly to a unidirectional rotary bearing which provides transmission torque in a unidirectional direction by using power machinery so as to reduce frictional resistance as the unidirectional rotary bearing rotates.

Description of the Prior Art

Conventional unidirectional rotary bearings contain three kinds of a ratchet bearing 60, an elastic friction bearing 70, and a magnetic friction bearing 80.

Referring to FIG. 1, the ratchet bearing 60 contains a connection loop 61 on which multiple springs 62 are arranged, multiple ratchet teeth 63 correspond to the multiple springs 62 respectively and pushed to multiple ratchets 64 individually so that when the connection loop 61 rotates in one direction, the multiple ratchet teeth 63 retain with and drive the multiple ratchets 64 respectively; and when the connection loop 61 rotates in another direction, the multiple ratchet teeth 63 press the multiple springs 62 to move on the multiple ratchets 64 individually and to rotate idly. When the ratchet bearing 60 rotates idly, the multiple ratchet teeth 63 are pushed by the multiple springs 62 to move to the multiple ratchets 64, thus producing moving resistance.

As shown in FIG. 2, the elastic friction bearing 70 contains a bearing ring 71 on which multiple springs 72 are arranged and push multiple friction elements 73 to a connection loop 74, hence when the elastic friction bearing 70 rotates in one direction, the multiple friction elements 73 movably press the multiple springs 72 and rotate idly by mating with the connection loop 74; when the elastic friction bearing 70 rotates in another direction, the multiple friction elements 73 rotate reversely and are pushed outwardly by the multiple springs 72, and the multiple friction elements 73 retain with the bearing ring 71 and the connection loop 74. The elastic friction bearing 70 idly rotates between the multiple friction elements 73 and the connection loop 74, and the multiple friction elements 73 are pushed by the multiple springs 72 to be against the connection loop 74 and the bearing ring 71.

When the multiple springs 62, 72 move and jump, an idle resistance of the unidirectional rotary bearing increases, for example, when the unidirectional rotary bearing is secured on the bicycle, the idle resistance greatly reduces a slide distance as not stepping the bicycle, thus decreasing jumping or rolling resistance and saving riding force.

As illustrated in FIGS. 3-5, the magnetic friction bearing 80 contains a bearing ring 81 on which multiple locking slots 82 are defined, each of the multiple locking slots 82 has a magnet 83 accommodated on a bottom thereof, and a friction element 84 is fixed in each locking slot 82 and is magnetically attracted by the magnet 83, wherein each magnet 83 magnetically attracts the friction element 84 to move to a connection loop 85. When the bearing ring 81 rotates in one direction, the friction element 84 slides on each magnet 83 and rotates idly by mating with the connection loop 85. When the bearing ring 81 rotates in another direction, the friction element 84 is magnetically attracted by each magnet 83 to move back to an original position, and the friction element 84 retains with and drives the bearing ring 81 and the connection loop 85 to rotate. As rotating idly, the friction element 84 produces a resistance to the connection loop 85, and the resistance is a magnetic attraction resistance when each magnet 83 magnetically attracts the friction element 84.

Thus the connection loop 61 of the ratchet bearing 60 actuates each ratchet tooth 63 of each ratchet 64 by using each spring 62. The connection loop 74 of the elastic friction bearing 70 drives each friction element 73 of the bearing ring 71 by using each spring 72. The connection loop 85 of the magnetic friction bearing 80 drives each friction element 84 of the bearing ring 81 by using each magnet 82. When each spring 62, 72 and each magnet 83 rotates idly, a resistance forms to the connection loops 61, 74, 85, hence the slide distance reduces as not stepping the bicycle. Therefore, when the number of the multiple springs 62, 72 or the multiple magnets 83 is reduced, the resistance decreases, wherein the number of the multiple springs 62, 72 or the multiple magnets 83 correspond to those of the multiple ratchet teeth 63 or the multiple friction elements 73, 84, and the number of the multiple ratchet teeth 63 or the multiple friction elements 84 are related to torque, i.e., the higher the numbers are, the stronger torque is, but the torque is lowered in order to decrease the frictional resistance of idle rotation.

Therefore, the friction resistance producing from idle rotation is decreased, but the actuated torque is increased. When the torque of the ratchet is insufficient, the ratchet is damaged, and when the torque of the friction element is insufficient, the friction element slides.

A sealed high capacity overrunning roller clutch is disclosed in the US Publication No. 20110168119. A cage 52 is fixed and actuates multiple rollers 50. However, the roller clutch is complicated and is assembled difficultly at a high cost. The cage 52 and the multiple rollers 50 operate in a same accommodation space to reduce a number of the multiple rollers 50. In addition, the accommodation space receives a plurality of alignment blocks 112 and accordion springs 59, thus reducing the number of the multiple rollers 50 greatly. Because the number of the multiple rollers 50 influences a torque of a torque through clutch 10, the less the multiple rollers are, the smaller the torque withstands.

The present invention has arisen to mitigate and/or obviate the afore-described disadvantages.

SUMMARY OF THE INVENTION

The primary objective of the present invention is to provide a unidirectional rotary bearing which contains a respective rotatable driving ring of two rotatable driving rings received in a respective circular groove of each peripheral surface of two sides of a bearing body and configured to drive multiple rollers to revolve, such that the multiple rollers rotate on the internal surface of the bearing body so as to enhance the number of the multiple rollers to a maximum value, wherein a number of the multiple rollers influences a torque of the unidirectional rotary bearing, for example, the more rollers is, the stronger torque of the unidirectional rotary bearing withstands.

To obtain the above-mentioned objectives, a unidirectional rotary bearing provided by the present invention contains a bearing body, multiple rollers, two rotatable driving rings, and at least two homing springs.

The bearing body includes an internal surface and two peripheral surfaces, wherein the internal surface has multiple receiving grooves separately arranged thereon and matching with the multiple rollers respectively, each of the multiple receiving grooves has an engagement segment and a disengagement segment, a depth of the engagement segment is less than a depth of the disengagement segment, and two sides of bearing body further includes two circular grooves. The multiple rollers are accommodated in the multiple receiving grooves of the bearing body respectively, and each of the multiple rollers moves between the engagement segment and the disengagement segment of the receiving groove, wherein each roller is columnar and has a diameter which is more than the depth of the engagement segment of each receiving groove of the bearing body and is less than the depth of the disengagement segment of each receiving groove of the bearing body, and each roller has two drive extensions extending outwardly from two opposite ends thereof respectively.

The two rotatable driving rings are housed in two circular grooves of the two peripheral surfaces of the bearing body individually, and an angle is produced between the two rotatable driving rings, wherein each rotatable driving ring has multiple apertures, each of the multiple apertures is more than each of the two drive extensions and is less than the diameter of each roller, and each drive extension is accommodated in each of the multiple apertures so that when each rotatable driving ring produces an angular rotation, each roller is driven synchronously.

Preferably, a number of the at least two homing springs are less than that of the multiple rollers so as to push the two rotatable driving rings to the engagement segment from the disengagement segment.

DETAILED DESCRIPTION OF THE PREFERRED EMBODIMENTS

Figure 1:
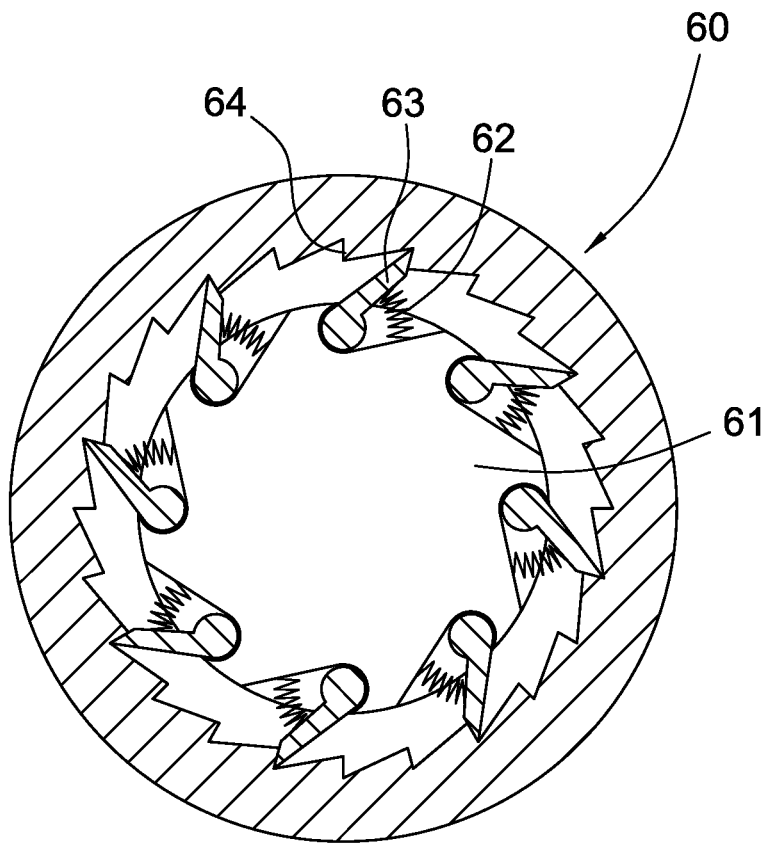
FIG. 1 is a cross-sectional view of a conventional ratchet bearing.
Figure 2:
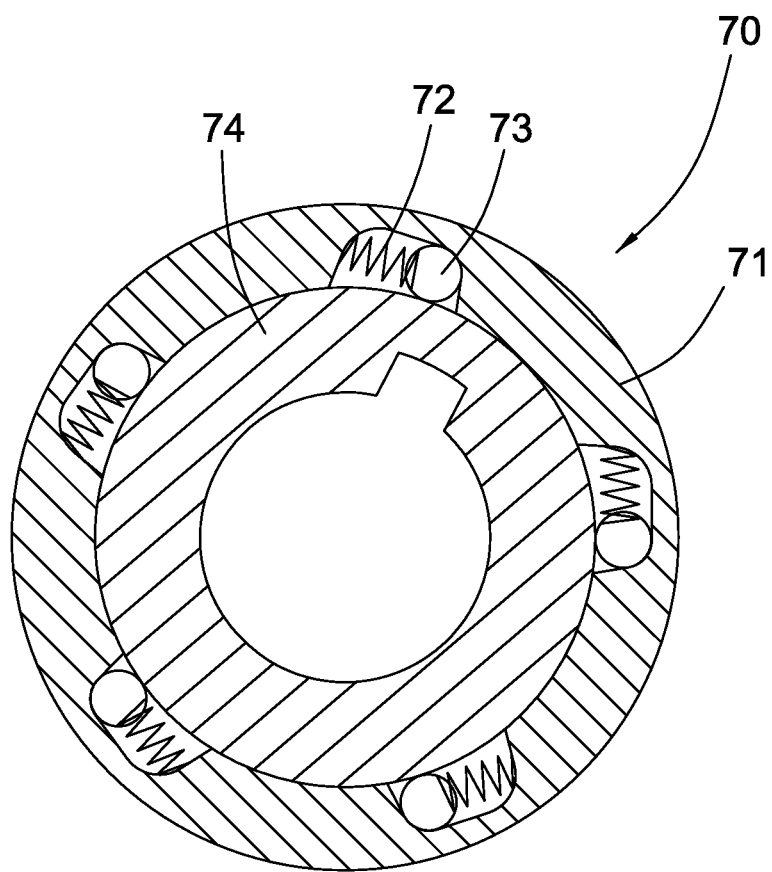
FIG. 2 is a cross-sectional view of a conventional elastic friction bearing.
Figure 3:
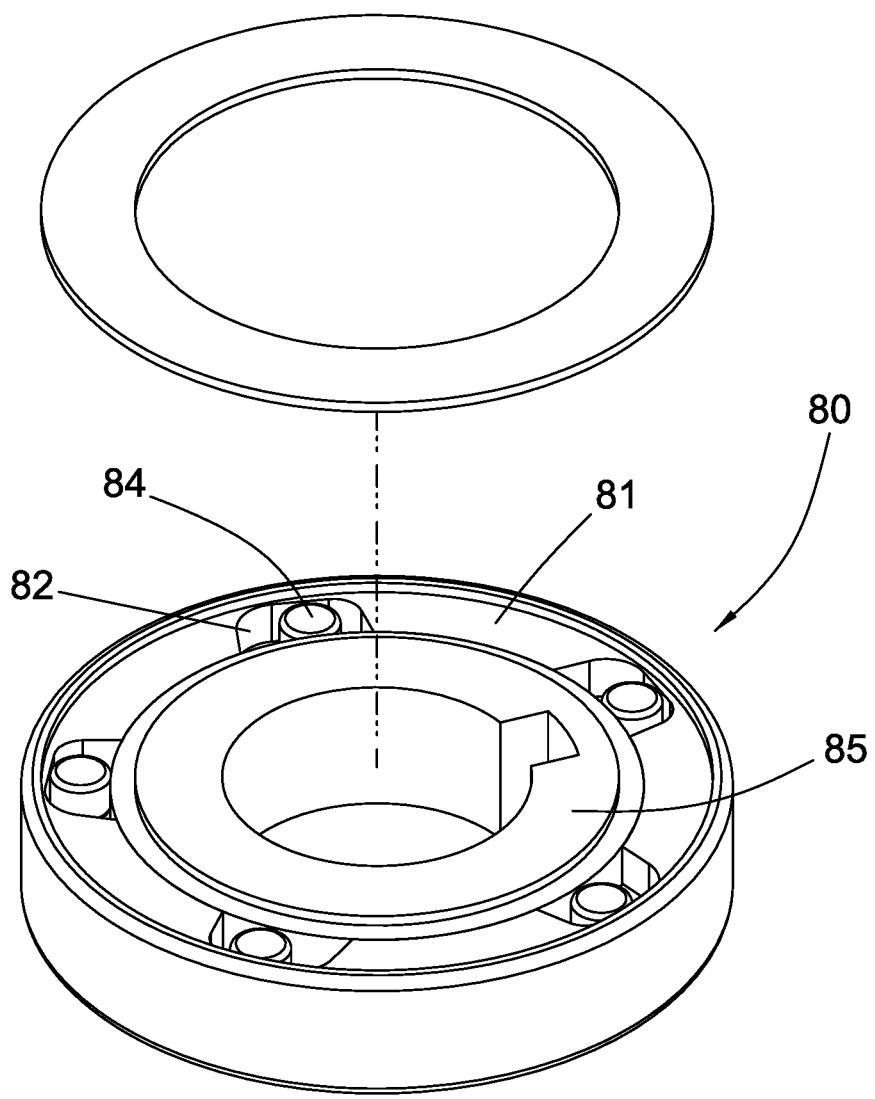
FIG. 3 is a perspective view of a conventional magnetic friction bearing.
Figure 4:
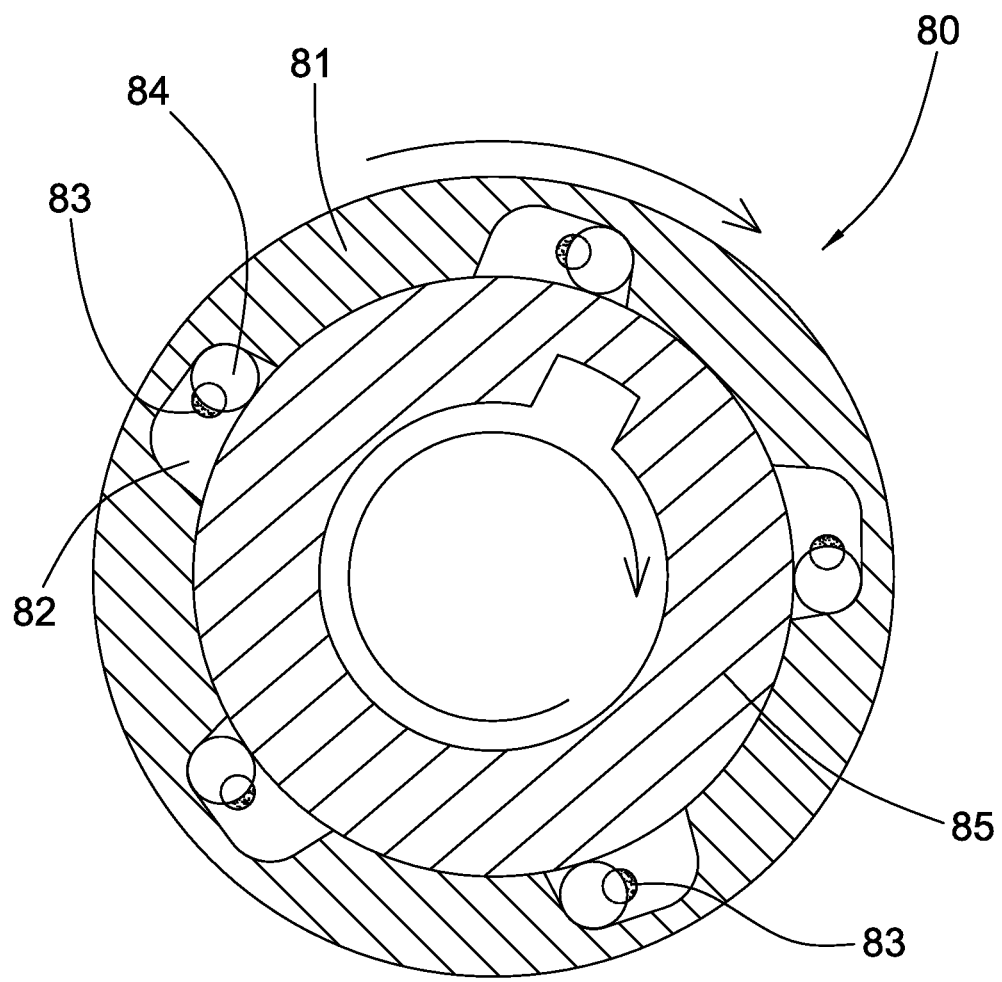
FIG. 4 is a cross-sectional view of the conventional magnetic friction bearing.
Figure 5:
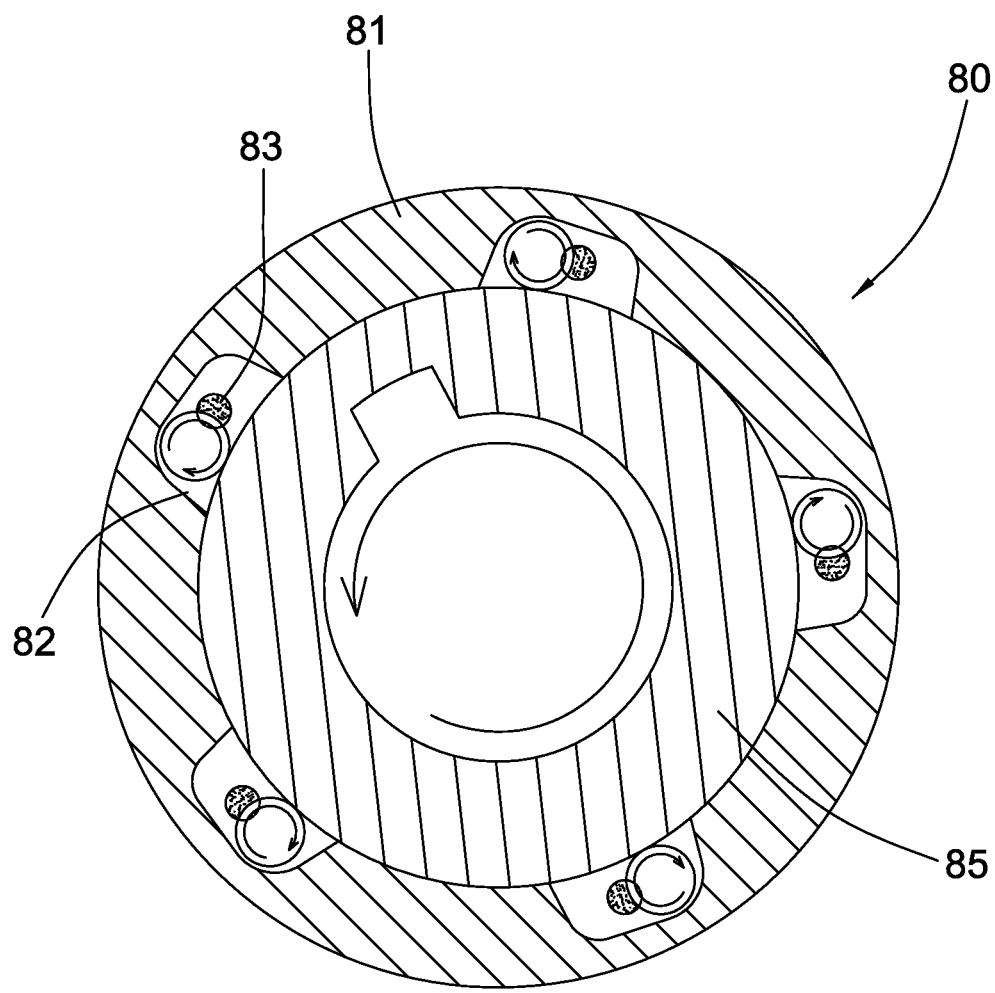
FIG. 5 is another cross-sectional view of the conventional magnetic friction bearing.
Figure 6:
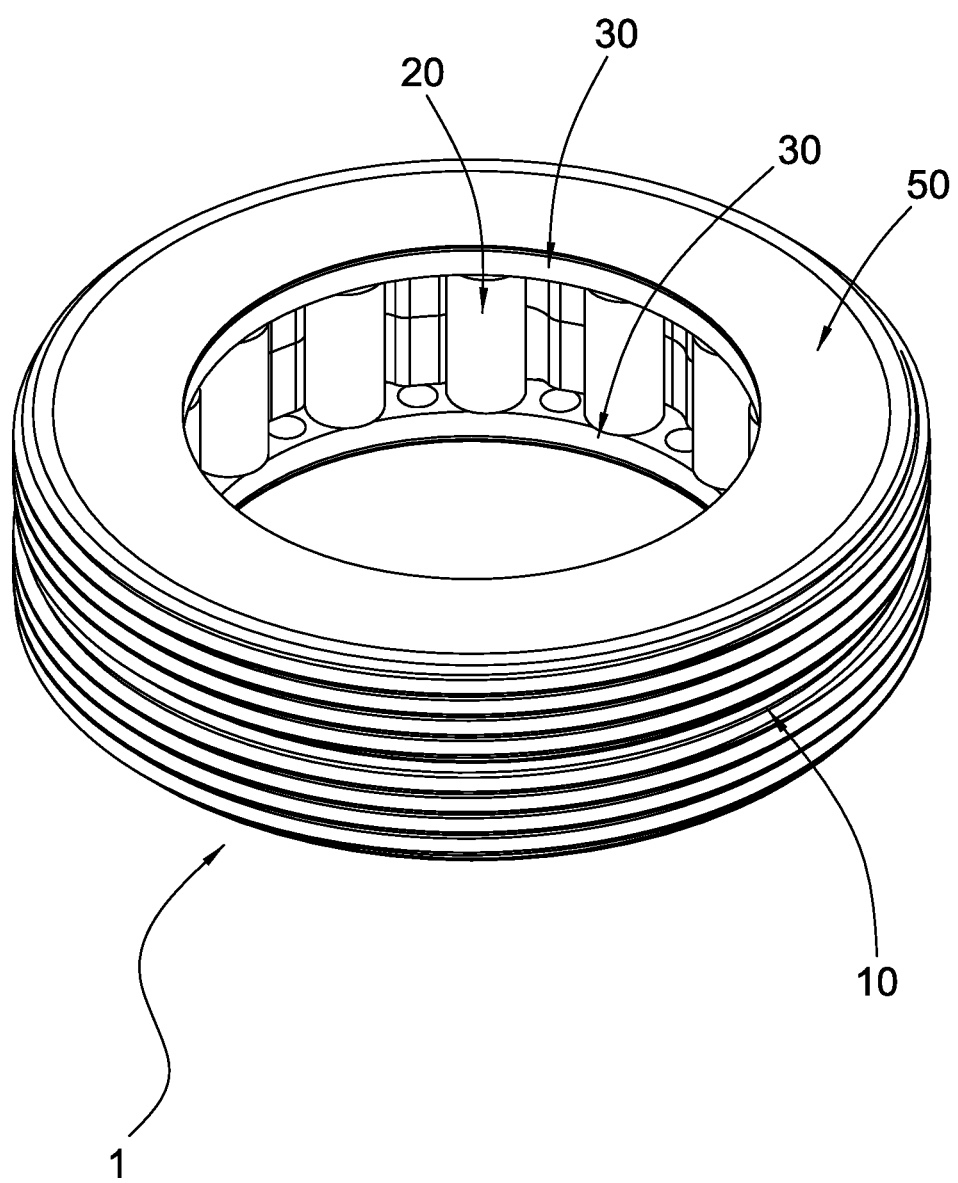
FIG. 6 is a perspective view showing the assembly of a unidirectional rotary bearing in accordance with a preferred embodiment of the present invention.
Figure 7:
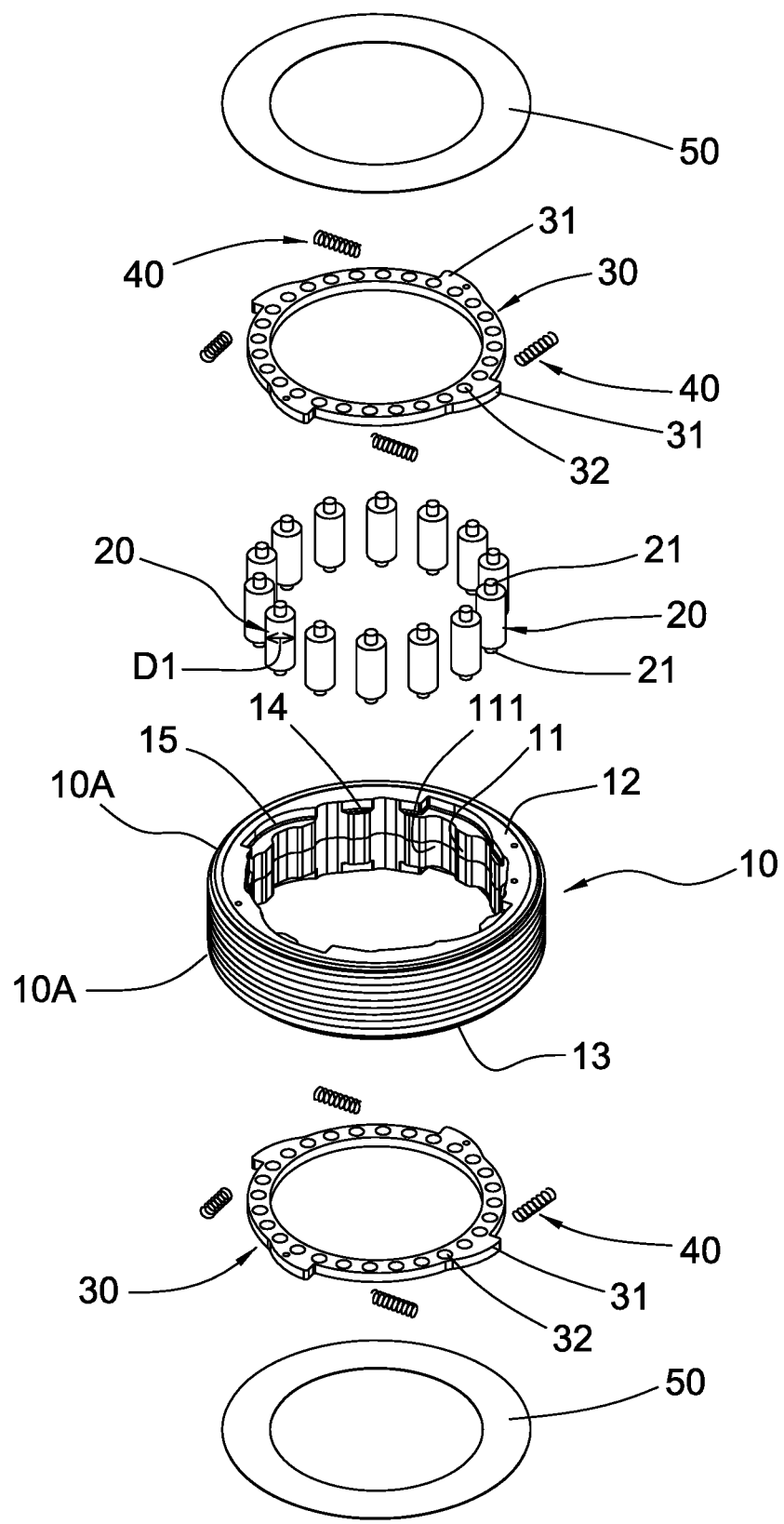
FIG. 7 is a perspective view showing the exploded components of the unidirectional rotary bearing in accordance with the preferred embodiment of the present invention.
Figure 8:
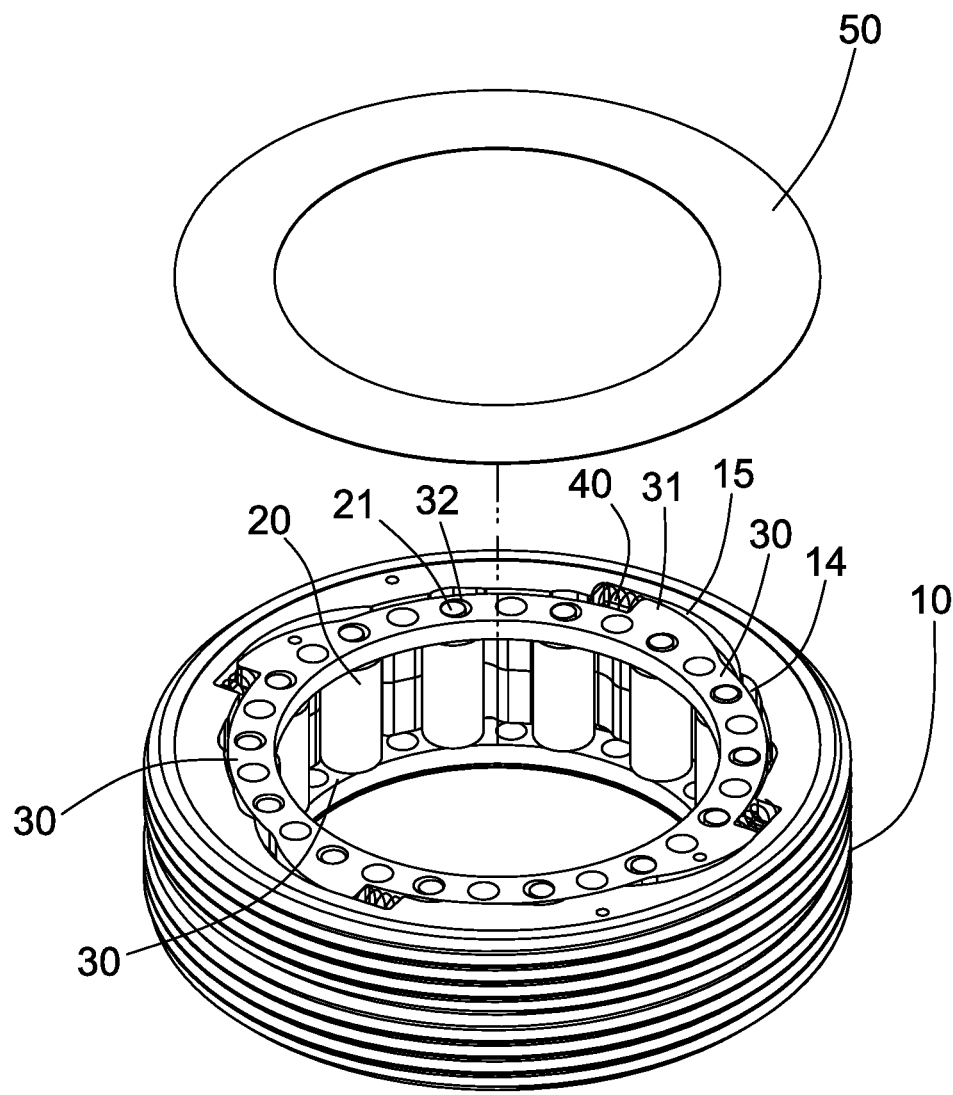
FIG. 8 is a perspective view showing the exploded components of a part of the unidirectional rotary bearing in accordance with the preferred embodiment of the present invention.
Figure 9:
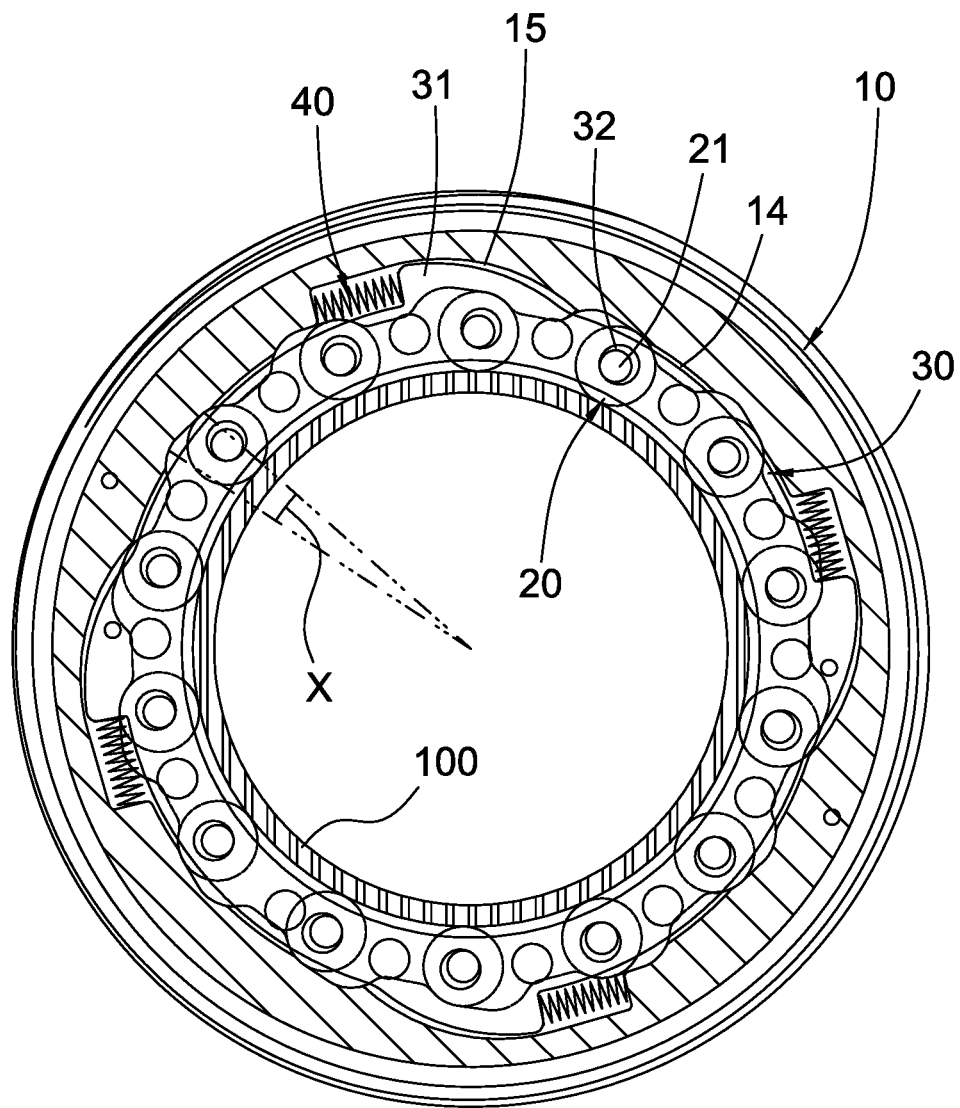
FIG. 9 is a cross-sectional view showing the assembly of the unidirectional rotary bearing in accordance with the preferred embodiment of the present invention.
Figure 10:
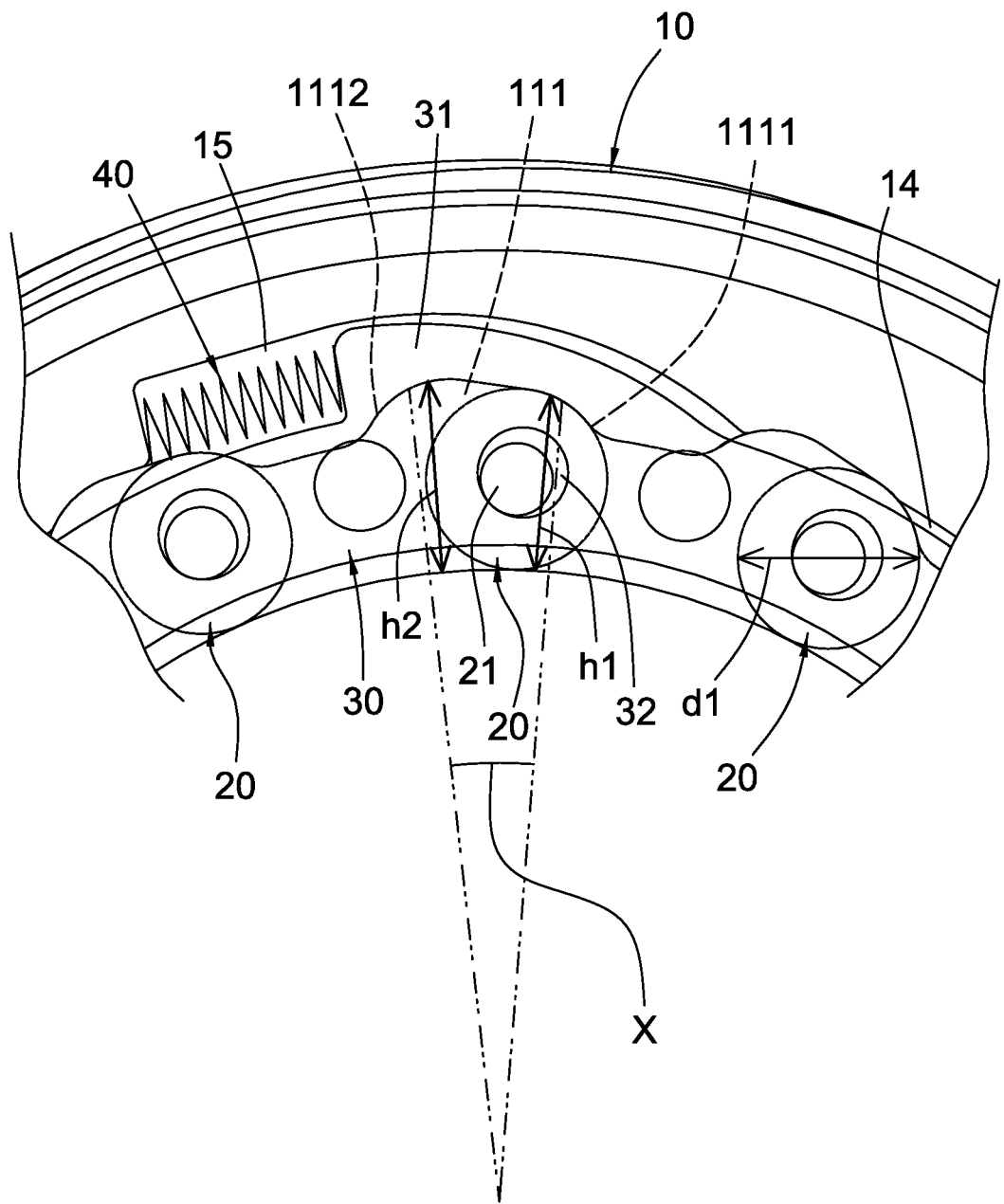
FIG. 10 is a cross-sectional view showing the assembly of a part of the unidirectional rotary bearing in accordance with the preferred embodiment of the present invention.
Figure 11:
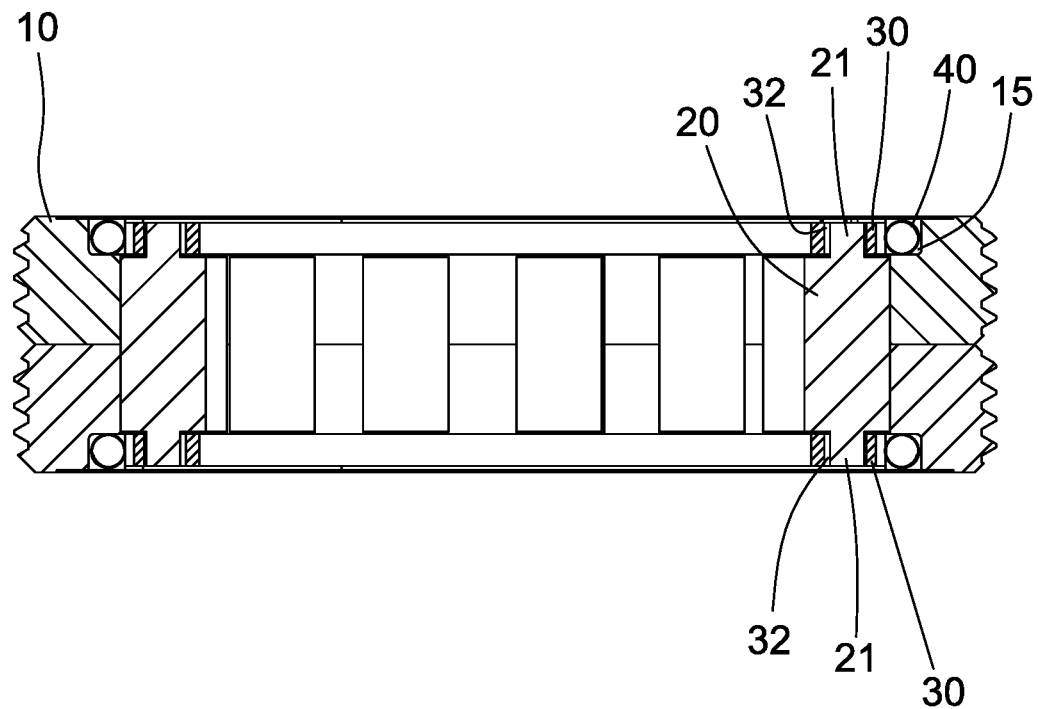
FIG. 11 is another cross-sectional view showing the assembly of the unidirectional rotary bearing in accordance with the preferred embodiment of the present invention.

The present invention will be clearer from the following description when viewed together with the accompanying drawings, which show, for purpose of illustrations only, a preferred embodiment in accordance with the present invention.

With reference to FIGS. 6-11, a unidirectional rotary bearing 1 in accordance with a preferred embodiment of the present invention comprises: a bearing body 10, multiple rollers 20, two rotatable driving rings 30, at least two homing springs 40, and two covers 50.

The bearing body 10 includes an internal surface 11 and two peripheral surfaces 12, 13, the internal surface 11 has multiple receiving grooves 111 separately defined on the internal surface 11, configured to accommodate the multiple rollers 20, and passing through the two peripheral surfaces 12, 13 of the bearing body 10, wherein a respective receiving groove 111 has an engagement segment 1111 and a disengagement segment 1112, the engagement segment 1111 has an engaging depth h1, and the disengagement segment 1112 has a disengaging depth h2, wherein the engaging depth h1 of the engagement segment 1111 is less than the disengaging depth h2 of the disengagement segment 1112. Each of the two peripheral surfaces 12, 13 has a circular groove 14 formed thereon and has at least two homing caves 15 mating with the circular groove 14, wherein a number of the at least two homing caves 15 corresponds to a number of the at least two homing springs 40.

A respective roller 20 is accommodated in the respective receiving groove 111 of the bearing body 10 and moves between the engagement segment 1111 and the disengagement segment 1112, wherein the respective roller 20 is columnar and includes a diameter d1 which is more than the engaging depth h1 of the engagement segment 1111 of the respective receiving groove 111 of the bearing body 10, the diameter d1 of the respective roller 20 is less than the disengaging depth h2 of the disengagement segment 1112 of the respective receiving groove 111 of the bearing body 10, and the respective roller 20 includes two drive extensions 21, the respective roller 20 has a respective drive extension 21 extends from a center of each of two ends thereof.

A respective rotatable driving ring 30 is received in the respective circular groove 14 of each peripheral surface 12 or 13 of two sides of the bearing body 10, and the two rotatable driving rings 30 are rotated at an angle X, wherein the respective rotatable driving ring 30 includes at least two returning plates 31 corresponding to a respective homing cave 15, multiple apertures 32 formed around the respective rotatable driving ring 30, and a respective aperture 32 corresponds to the respective receiving groove 111, wherein a diameter of the respective aperture 32 is more than a diameter of the respective drive extension 21, the diameter of the respective drive extension 21 is less than the diameter d1 of the respective roller 20, the respective drive extension 21 passes through the respective aperture 32 so that when the two rotatable driving rings 30 rotate at the angle X, the multiple rollers 20 are driven by the two rotatable driving rings 30 to move circumferentially, the angle X of the two rotatable driving rings 30 is a distance where the respective roller 20 moves between the engagement segment 1111 and the disengagement segment 1112.

The number of the at least two homing springs 40 are fewer than a number of the multiple rollers 20, wherein a respective homing spring 40 is accommodated in the respective homing cave 15, a first end of the respective homing spring 40 abuts against the bearing body 10, and a second end of the respective homing spring 40 contacts with a returning plate 31 so that the two rotatable driving rings 30 are pushed from the disengagement segment 1112 to the engagement segment 1111, and the multiple rollers 20 are controlled by the at least two homing springs 40 to rotate at the angle X between the engagement segment 1111 and the disengagement segment 1112.

The two covers 50 are fixed on the two peripheral surfaces 12, 13 of the bearing body 10 to limit the two rotatable driving rings 30 and the multiple rollers 20, such that the two rotatable driving rings 30 and the multiple rollers 20 are not fallen out, and the two rotatable driving rings 30 rotate at the angle X smoothly.

Figure 12:
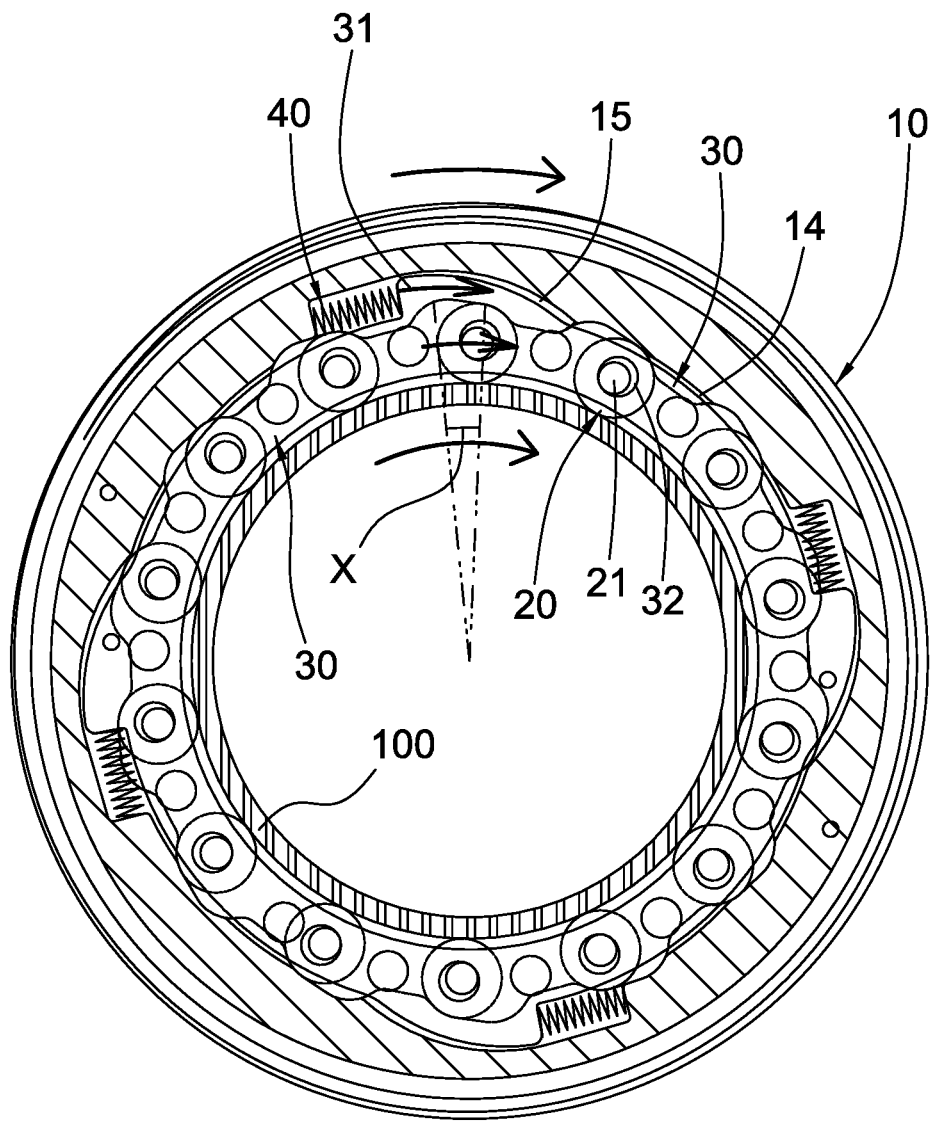
FIG. 12 is a cross-sectional view showing the operation of the unidirectional rotary bearing in accordance with the preferred embodiment of the present invention.

When driving the multiple rollers 20 to rotate synchronously, as illustrated in FIG. 12, a connection loop 100 is inserted through a center of the bearing body 10 to contact with the respective roller 20. When the connection loop 100 rotates clockwise, the respective roller 20 is driven to revolve clockwise and to push the two rotatable driving rings 30 to rotate synchronously. Since the two rotatable driving rings 30 are driven by the respective roller 20, when one roller 20 rotates, the other rollers 20 revolves synchronously, wherein the respective roller 20 and the two rotatable driving rings 30 are pushed to rotate at the angle X so that the respective roller 20 moves from the disengagement segment 1112 to the engagement segment 1111. In the meantime, the respective roller 20 engages with the connection loop 100 and the bearing body 10 so that the connection loop 100 rotates synchronously with the bearing body 10, and the respective homing spring 40 pushes the two rotatable driving rings 30.

Figure 13:
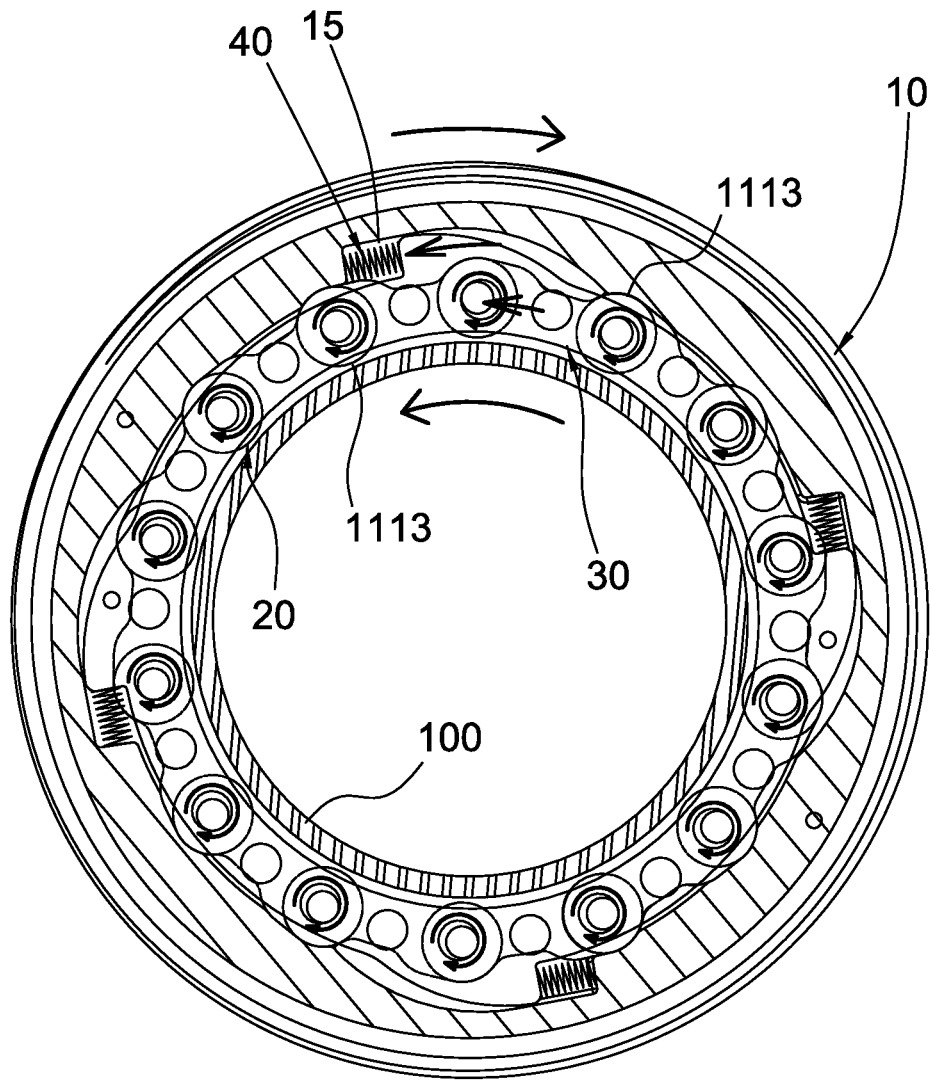
FIG. 13 is another cross-sectional view showing the operation of the unidirectional rotary bearing in accordance with the preferred embodiment of the present invention.
Figure 14:
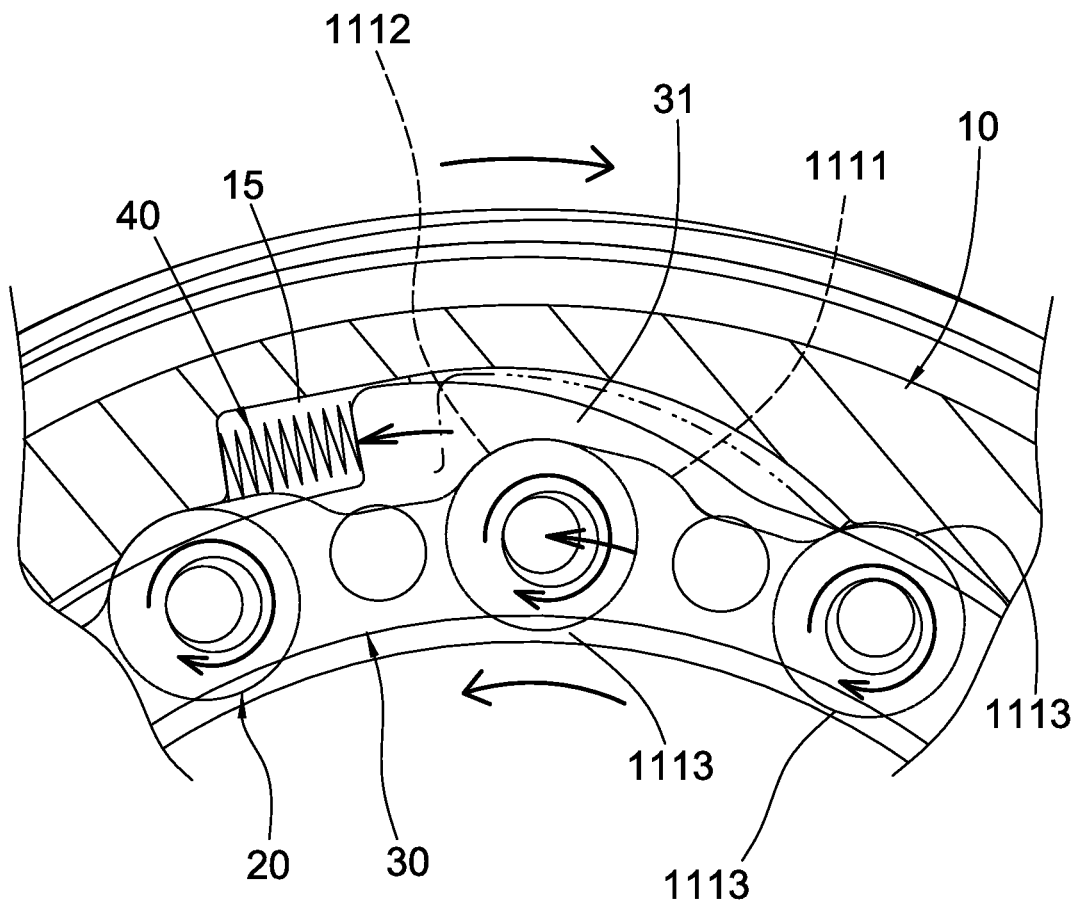
FIG. 14 is an amplified cross-sectional view showing the operation of a part of the unidirectional rotary bearing according to the preferred embodiment of the present invention.
Figure 15:
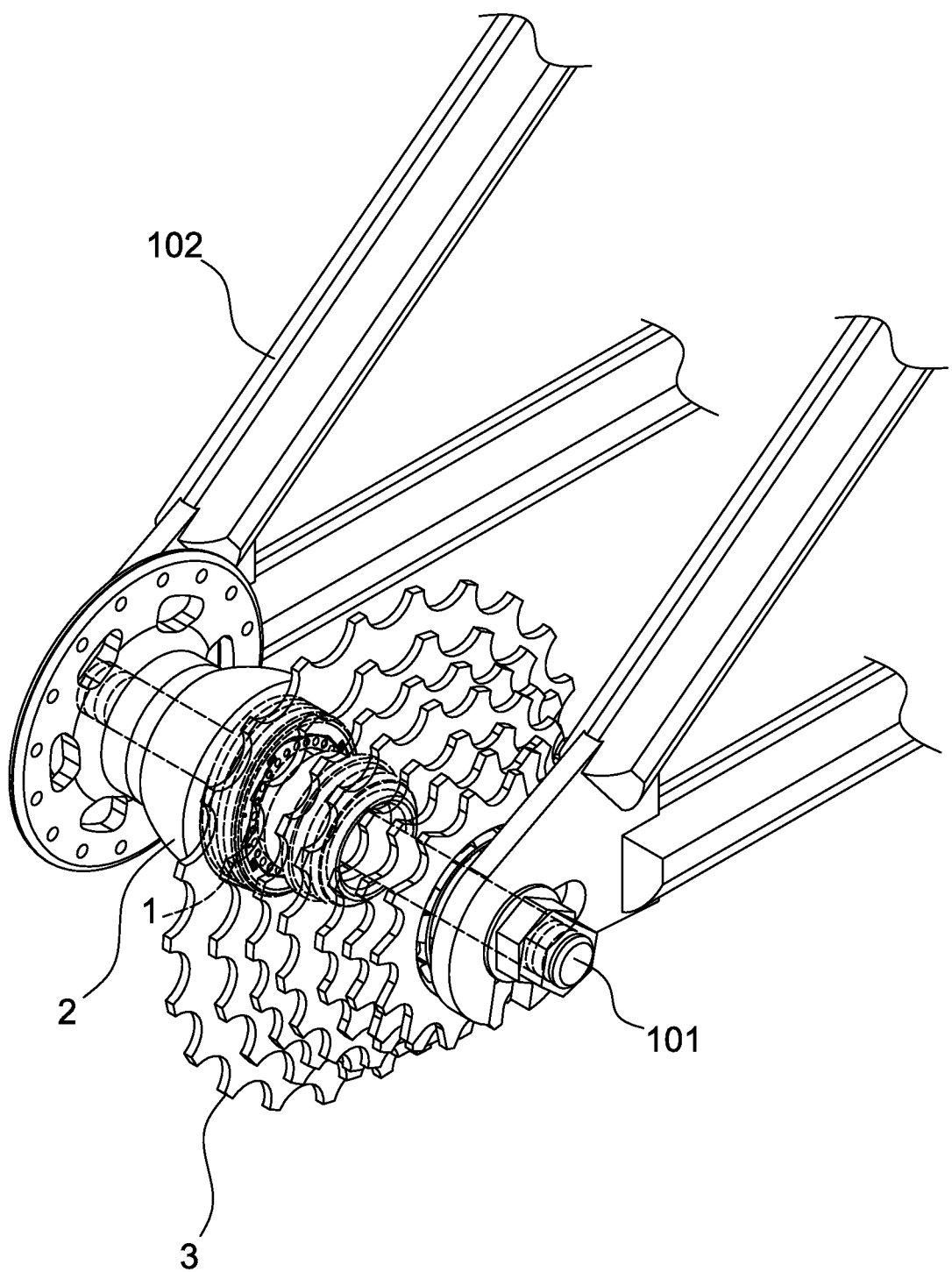
FIG. 15 is a perspective view showing the application of the unidirectional rotary bearing according to the preferred embodiment of the present invention.
Figure 16:
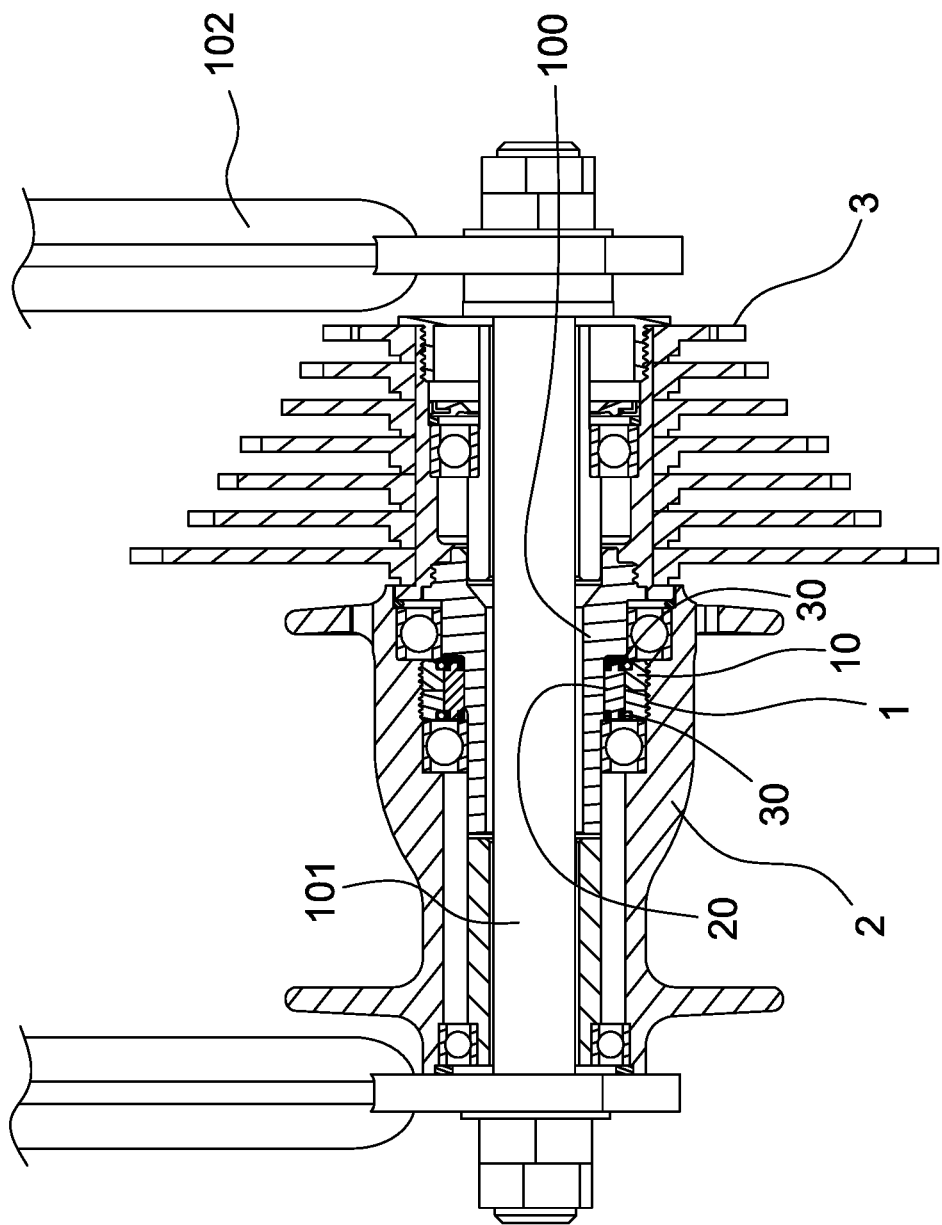
FIG. 16 is a cross-sectional view showing the application of the unidirectional rotary bearing according to the preferred embodiment of the present invention.
Figure 17:
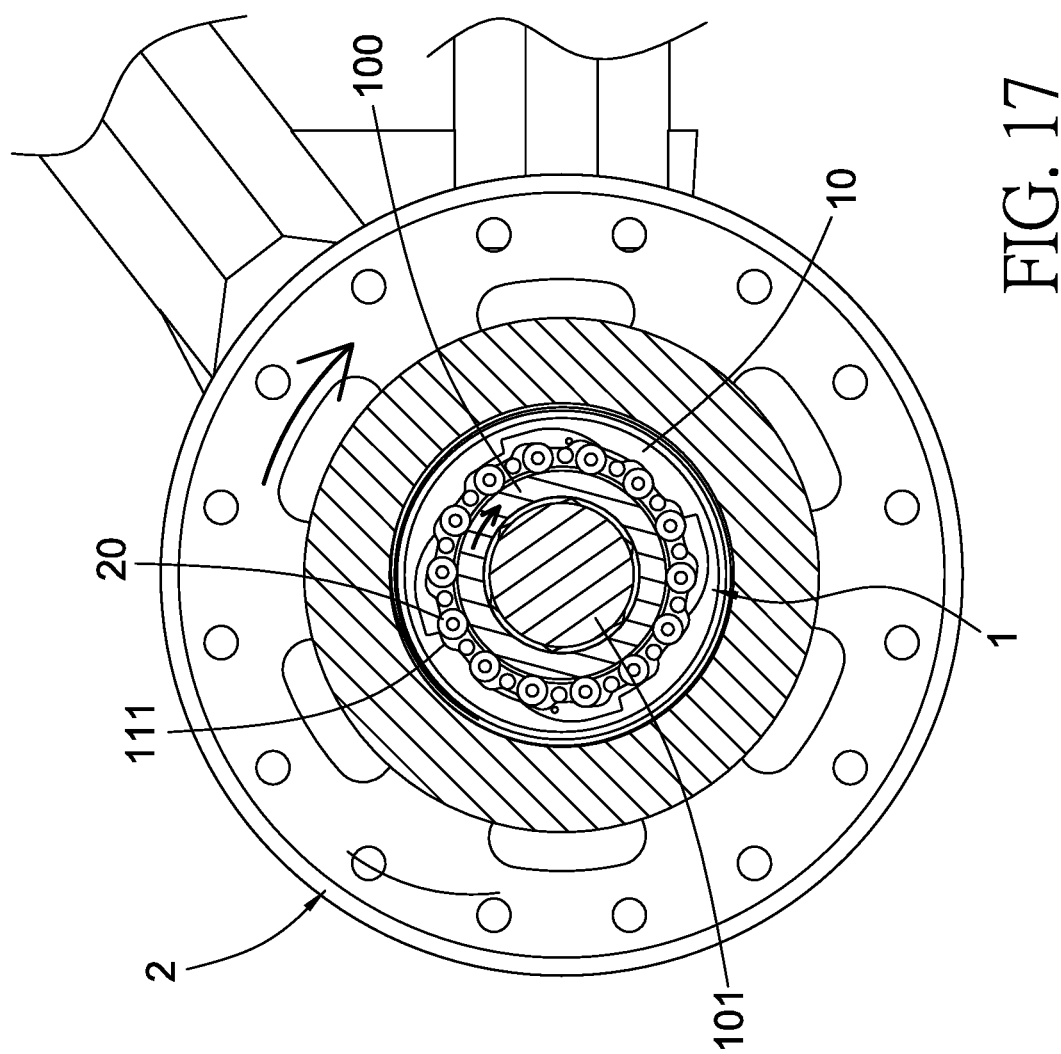
FIG. 17 is another cross-sectional view showing the application of the unidirectional rotary bearing according to the preferred embodiment of the present invention.
Figure 18:
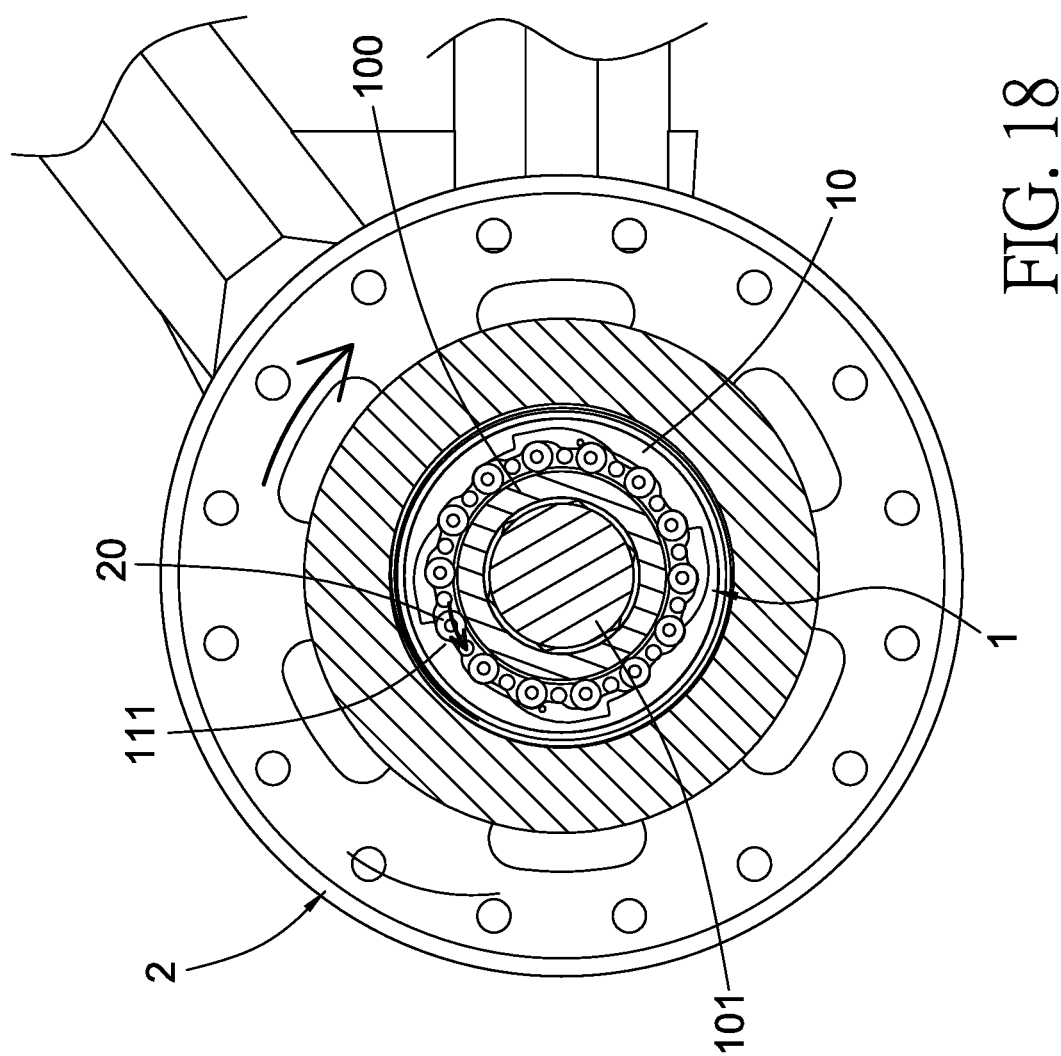
FIG. 18 is still another cross-sectional view showing the application of the unidirectional rotary bearing according to the preferred embodiment of the present invention.

When the connection loop 100 does not rotate, revolves counterclockwise or a rotation speed of the connection loop 100 is slower than a rotation speed of the bearing body 10, as shown in FIGS. 13 and 14, the bearing body 10 presses the respective homing spring 40 so that the connection loop 100 rotates counterclockwise to push the respective roller 20, the respective roller 20 rotates counterclockwise to push the two rotatable driving rings 30 to revolve counterclockwise, hence the respective roller 20 is pushed by the two rotatable driving rings 30 to move from the engagement segment 1111 to the disengagement segment 1112. Meantime, a clearance 1113 is defined between the respective roller 20 and the bearing body 10 or the connection loop 100 until the connection loop 100 and the bearing body 10 do not rotate, and the respective roller 20 rotates idly in the respective aperture 32, wherein the respective roller 20 pushes the two rotatable driving rings 30 to revolve counterclockwise at the angle X.

In application, as shown in FIGS. 15-18, the unidirectional rotary bearing 1 is disposed on a hub 2 mounted between a rear wheel and a freewheel 3 (which is connected with the connection loop 100), the hub 2 includes a center shaft 101 fixed with a bicycle frame 102, and the unidirectional rotary bearing 1 is configured to drive the freewheel 3 to revolve synchronously or asynchronously.

When stepping a pedal to drive a bicycle to run, the freewheel 3 is driven by the pedal to rotate clockwise, and the unidirectional rotary bearing 1 actuates the rear wheel and the freewheel 3 synchronously.

When the pedal of the bicycle is not stepped, the freewheel 3 does not rotate, and the rear wheel keeps rotation forward, wherein the unidirectional rotary bearing 1 does not actuate the rear wheel and the freewheel 3.

Therefore, the unidirectional rotary bearing 1 of the present invention contains advantages as follows:

1. The respective rotatable driving ring 30 is received in the respective circular groove 14 of each peripheral surface 12 or 13 of the bearing body 10 and is configured to drive the multiple rollers 20 to revolve, such that the multiple rollers 20 rotate on the internal surface 11 of the bearing body 10 so as to enhance the number of the multiple rollers 20 to a maximum torque value, wherein the number of the multiple rollers 20 influences a torque of the unidirectional rotary bearing 1, for example, the more rollers 20 is, the stronger torque of the unidirectional rotary bearing 1 withstands.

2. The unidirectional rotary bearing 1 actuates the two rotatable driving rings 30 by using less homing spring 40, and two sides of the two rotatable driving rings 30 are actuated to drive the multiple rollers 20 to revolve synchronously, such that friction is decreased when the multiple rollers 20 is not driven synchronously and rotates idly. Preferably, the number of the multiple rollers 20 is increased to enhance the torque, and the two rotatable driving rings 30 actuate the multiple rollers 20 to reduce the friction when the multiple rollers 20 rotate idly.

While various embodiments in accordance with the present invention have been shown and described, it is clear to those skilled in the art that further embodiments may be made without departing from the scope of the present invention.

What is claimed is:

1. A unidirectional rotary bearing comprising a bearing body, multiple rollers, two rotatable driving rings, and at least two homing springs;

the bearing body including an internal surface and two peripheral surfaces, and the internal surface having multiple receiving grooves separately defined on the internal surface and configured to accommodate the multiple rollers, wherein a respective receiving groove has an engagement segment and a disengagement segment, the engagement segment has an engaging depth, and the disengagement segment has a disengaging depth, wherein the engaging depth of the engagement segment is less than the disengaging depth of the disengagement segment;

wherein the bearing body further including two circular grooves, and a respective circular groove is defined in each of the two peripheral surfaces;

wherein a respective roller is columnar and includes a diameter which is more than the engaging depth of the engagement segment of the respective receiving groove of the bearing body, the diameter of the respective roller is less than the disengaging depth of the disengagement segment of the respective receiving groove of the bearing body, the respective roller includes two drive extensions, and the respective roller has a respective drive extension extending from a center of each of two ends thereof;

wherein a respective rotatable driving ring includes multiple apertures formed around the respective rotatable driving ring, and a respective aperture corresponds to the respective receiving groove;

wherein the respective roller is accommodated in the respective receiving groove and moves between the engagement segment and the disengagement segment;

wherein the respective rotatable driving ring is received in the respective circular groove of each peripheral surface of two sides of the bearing body, and the two rotatable driving rings are rotated at an angle, the respective drive extension passes through the respective aperture so that when the two rotatable driving rings rotate at the angle, the multiple rollers are driven synchronously or one of the multiple rollers revolves to actuate the two rotatable driving rings and the other rollers to rotate at the angle;

wherein a number of the at least two homing springs are fewer than a number of the multiple rollers, a first end of a respective homing spring abuts against the bearing body, and a second end of the respective homing spring contacts with one of the two rotatable driving rings so that the two rotatable driving rings are pushed from the disengagement segment to the engagement segment;

wherein when the two rotatable driving rings push the respective roller to move from the disengagement segment to the engagement segment, the respective roller engages with the bearing body; when the two rotatable driving rings revolve to push the respective roller to move from the engagement segment to the disengagement segment, a clearance is defined between the respective roller and the bearing body or a connection loop, and wherein the respective circular groove has at least two homing caves, a number of the at least two homing caves corresponds to the number of the at least two homing springs, the respective rotatable driving ring includes at least two returning plates corresponding to the at least two homing caves, and the respective homing spring is accommodated in the respective homing cave.

2. The unidirectional rotary bearing as claimed in claim 1 further comprising two covers fixed on the two peripheral surfaces of the bearing body to limit the two rotatable driving rings.

* * * * *